April 11, 1961  H. B. FELDER  2,978,902
TORQUE MEASUREMENT APPARATUS
Filed Sept. 5, 1956
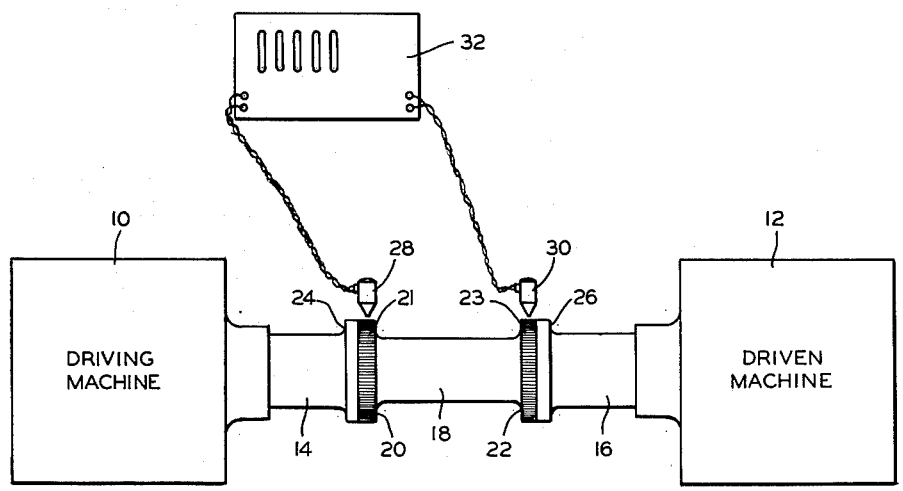
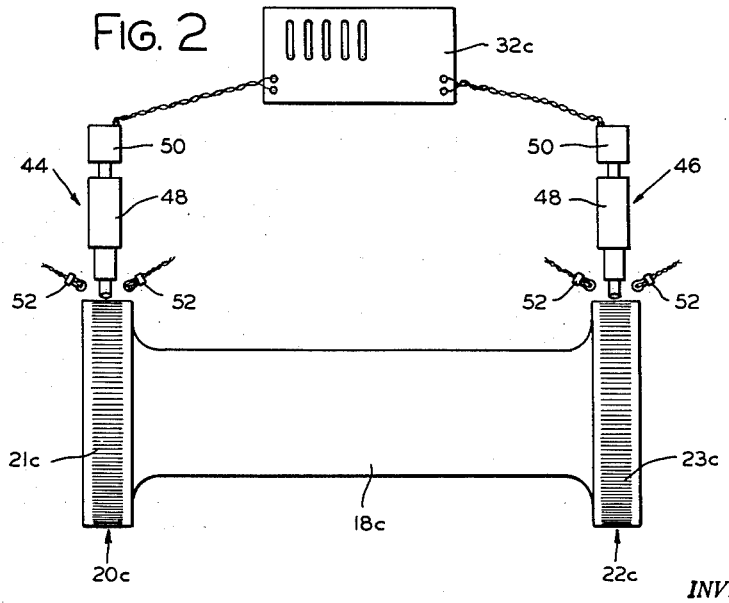
INVENTOR.
HOWARD B. FELDER
BY
ATTORNEY

United States Patent Office 2,978,902
Patented Apr. 11, 1961

2,978,902

TORQUE MEASUREMENT APPARATUS

Howard B. Felder, Berrien Springs, Mich., assignor to Clark Equipment Company, a corporation of Michigan Filed Sept. 5, 1956, Ser. No. 608,146

7 Claims. (Cl. 73—136)

The present invention relates to apparatus for determining the twist in a shaft or other resilient member in order to determine the torque being transmitted by the shaft.

Previous apparatus and mechanisms of this type have generally employed and been dependent upon a meter, oscilloscope, or other device which is subject to inaccuracies and variations depending upon adjustment, ambient conditions, age, voltage applied and other variables. It is the object of the present invention to eliminate inaccuracies and variations and provide a torque measuring apparatus which gives a uniform result not affected by such variables.

It is a further object of my invention to provide a torque measuring apparatus which is adaptable for the measurement of very large torques as well as moderate and smaller torques.

In carrying out my invention in one form, I provide a shaft which is torsionally resilient and has strain characteristics such that its "wind-up" caused by torque being transmitted through it is proportional to the torque. Flanges are provided at the ends of the shaft and these flanges are provided with very closely and uniformly spaced magnetic, optical or other indicia. In order to determine the wind-up of the shaft I employ a digital counter or other device to determine the torsional displacement of one of the flanges with respect to the other.

For a clearer and more complete understanding of my invention, reference should be had to the accompanying drawing in which—

Fig. 1 is a schematic illustration of one preferred embodiment of my invention, while Fig. 2 illustrates a modified embodiment.

Referring to the drawing, there is shown in Fig. 1 an arrangement of my apparatus for use in determining the torque transmitted from a driving machine 10 to a driven machine 12. The driving machine is provided with an output shaft 14 and the driven machine with an input shaft 16. Connected between these two shafts is a torsionally resilient member 18 which is illustrated herein as a metal shaft having flange portions 20 and 22 at the ends thereof. These two flange portions on shaft 18 are connected securely, in any suitable manner, to flange portions 24 and 26 respectively on the said output and input shafts.

As illustrated herein, flange portions 20 and 22 are provided with equal numbers of very closely spaced magnetic indicia, 21 and 23 respectively, arranged uniformly around the periphery thereof. These indicia are shown on the drawing as a plurality of lines, for sake of illustration, but it will be understood that these lines represent a magnetic pattern around the periphery of each flange. This pattern may be applied by known means to the metal of which the flange sections of the resilient member are formed, or a metal or plastic base magnetic tape containing such a pattern may be secured around the outer periphery of each flange if desired.

In any event, a magnetic pattern containing a large number of indicia per inch is applied around the periphery of both flanges 20 and 22, with each flange being provided with the same quantity of indicia and the indicia on both flanges being uniformly spaced. Using presently known techniques it is possible to apply at least 700 magnetic indicia per inch to these flanges or tapes thereon.

A pair of magneto-electric sensing heads 28 and 30 are provided to sense the number of magnetic indicia on the flanges, one of these sensing heads being located adjacent each of the flanges as illustrated in Fig. 1. As the flanges are rotated adjacent the sensing heads, the sensing heads transmit an electric pulse to a computer device 32 for each of the indicia which rotates past the sensing head. Computer 32 is a known electrical computing device, preferably of the digital type, which counts the number of indicia passing each of the sensing heads, and is arranged to display the difference between the total of the indicia passing one head and the total of the indicia passing the other.

When shaft 18 is merely rotating and transmitting no torque, there is no difference in the number of indicia passing the two heads; therefore, the computer device 32 shows zero. However, when torque is applied to member 18, flange 22 is displaced torsionally from flange 20 by an amount which is proportional to the torque transmitted. Computer 32 under these conditions displays a number or symbol which is proportional to the amount of displacement and thus proportional to the torque. Computer 32 may be arranged and calibrated to display this torque in foot pounds or other units, if desired; however, it is frequently advantageous to take the data from computer 32 in digital form for recording on punched cards, tape or other automatic data handling means.

It will thus be apparent that I have provided to torque measurement apparatus which requires no electrical connection between the moving and stationary parts, and which is not susceptible to zero drift error produced by the variables mentioned hereinbefore. Moreover, a change in ambient temperature induces no error or change of calibration beyond the change in spring modulus of resilient member 18.

A feature of this apparatus is that the signal from either flange of the risilient member may also be used to actuate known counting devices to determine speed to a high degree of accuracy. In my apparatus, dynamic variations in torque may be recorded at the very high speeds of purely digital devices; not limited by the response of D'Arsonval instruments or analog-to-digital conversion devices.

Fig. 2 of the drawing shows an embodiment of my invention employing optical means for obtaining the signals from the ends of the resilient member. The operation of this embodiment is similar to that of Fig. 1 except for the means for obtaining the signals.

In Fig. 2 I have indicated the resilient member by the symbol 18c. This resilient member includes at the ends symmetrical flanged portions which have polished surfaces around the outer periphery. On these polished surfaces are scribed in a known manner for making optical gratings, serrations which comprise uniformly spaced indicia 21c and 23c. The number of indicia 21c is made exactly equal to the quantity of indicia 23c. With presently known techniques many thousands of lines or serrations per inch may be scribed on these surfaces. Alternatively, photosensitive tape containing the indicia may be employed, if desired, instead of scribing the indicia directly on to the peripheral surfaces of the flanges.

To obtain signals from these indicia I provide optical apparatus 44 and optical apparatus 46 located adjacent respectively the two flanges 20c and 22c. Each of the optical apparatuses includes a microscope 48, a suitable light source or sources 52, and a photoelectric sensing device 50 embodying a photo cell. The light sources are located adjacent the serrated surfaces to provide strong illumination thereon, while the microscope is located in a position which enables it to transmit to photoelectric sensing device 50 the variations in light produced by the serrations moving through the light field produced by the sources 52. The photoelectric device in turn transmits electrical signals, which vary responsively to variations in the reflected light from the indicia, to a computer 32c in Fig. 1.

It will be readily understood that my torque measurement apparatus may be adapted for small, medium or large torque measurements by selecting suitable proportions and characteristics for member 18 (or 18c as the case may be). The number of indicia, of course, may be varied to suit the application and to secure the accuracy required. The length and resiliency of the resilient member likewise may be selected to secure the necessary amount of torsional displacement to secure accurate results. Similarly, the flange members carrying the indicia may be made larger to secure the resolution and accuracy desired. In this connection it will be understood, of course, that it is not essential to my invention that the resilient member be provided with flanges. The indicia in some cases may be applied directly to the resilient member, or other equivalent means of applying these indicia may be employed.

Thus, while I have disclosed herein certain preferred embodiments of my invention it will be understood that I do not intend to be limited thereto, but I intend to cover by the appended claims all modifications which fall within the true spirit and scope of my invention.

I claim:

1. A torque measurement apparatus comprising an elongated torsionally resilient rotatable member arranged to be connected between a driving and a driven machine, two circular indicia carrying portions located in coaxial spaced-apart relation on the said resilient member, means for deriving signals from the said indicia carrying portions, and indicia counting means responsive to said signals for determining the difference between the quantity of indicia on one said portion passing a first reference point adjacent thereto and the quantity of indicia on the other said portion passing a second reference point adjacent thereto, for determining the torsional displacement of one of the said indicia carrying portions with respect to the other.

2. A torque measurement apparatus comprising, an elongated torsionally resilient rotatable member arranged to be connected between a driving and a driven machine, a first circular indicia carrying portion on the said resilient member located adjacent one end thereof and having a plurality of uniformly spaced indicia around the periphery thereof, a second circular indicia carrying portion adjacent the other end of the said resilient member and having the same number of uniformly spaced indicia around the periphery thereof as the said first indicia carrying portion, first sensing means adjacent the said first indicia carrying portion for deriving signals from the indicia on the first portion which pass the first sensing means, second sensing means adjacent the said second indicia carrying portion for deriving signals from the indicia on the second portion which pass the second sensing means, and indicia counting computer means responsive to the signals from the said two sensing means for determining the difference in the quantities of indicia which pass the respective sensing means for determining the torsional displacement of one said indicia carrying portion with respect to the other said indicia carrying portion thereby determining the torque transmitted through the said resilient rotatable member from the driving to the driven machine.

3. A torque measurement apparatus comprising, an elongated torsionally resilient rotatable member arranged to be connected between a driving and a driven machine, a first indicia carrying flange portion on the said resilient member at one end thereof having a plurality of uniformly spaced magnetic indicia around the periphery of the flange portion, a second indicia carrying flange portion at the other end of the said resilient member having the same number of uniformly spaced magnetic indicia around the periphery thereof as the said first flange portion, first magneto-electric sensing means adjacent the said first flange portion for signalling the quantity of the indicia on the said first flange portion which pass the first sensing means, second magneto-electric sensing means adjacent the said second flange portion for signalling the quantity of the indicia on the second flange portion which pass the second sensing means, and indicia counting computer means responsive to electric signals from the said two sensing means for determining the difference in the said quantities and thereby determining the torsional displacement of one said flange portion with respect to the other said flange portion for determining the torque transmitted through the said resilient rotatable member from the driving to the driven machine.

4. A torque measurement apparatus comprising an elongated torsionally resilient rotatable member arranged to be connected between a driving and a driven machine, two circular indicia carrying portions on the said resilient member located respectively adjacent the ends thereof, first sensing means adjacent a first one of the said indicia carrying portions for continuously signalling the total of the indicia on the said first portion which passes the said first sensing means, second sensing means adjacent the other said indicia carrying portion for continuously signalling the total of the indicia on the said other portion which pass the second sensing means, and means responsive to the signals from the said sensing means for continuously determining the difference between the two said totals.

5. A torque measurement apparatus comprising an elongated torsionally resilient rotatable member arranged to be connected between a driving and a driven machine, a first circular portion on the said resilient member located adjacent one end thereof, a plurality of closely spaced uniformly arranged magnetic indicia on the said first circular portion entirely around the periphery thereof, a second circular portion on the said resilient member located adjacent the other end thereof, a second set of closely spaced uniformly arranged magnetic indicia on the said second circular portion entirely around the periphery thereof, the total number of indicia on the said second circular portion being exactly the same as the total number on the said first circular portion, first magneto-electric sensing means adjacent the indicia on the said first circular portion for determining the total of the indicia on the first portion which pass the first sensing means, second magneto-electric sensing means adjacent the indicia on the said second circular portion for determining the total of the indicia on the second portion which pass the second sensing means, and indicia counting electric computer means responsive jointly to the signals from the two said sensing means for determining the difference in the quantities of indicia passing the said sensing heads whereby when torque is applied to the said resilient rotatable member the said difference is proportional to the torque applied.

6. A torque measurement apparatus comprising, an elongated torsionally resilient rotatable member arranged to be connected between a driving machine and driven machine, a first indicia carrying portion on the said resilient member at one end thereof having a plurality of uniformly spaced indicia around the periphery of the indicia carrying portion, a second indicia carrying portion at the other end of the said resilient member having the same number of uniformly spaced indicia around the periphery thereof as the said first portion, first photoelectric sensing means located adjacent the said first portion for signalling the quantity of indicia on the said first portion which pass the first sensing means, second photoelectric sensing means adjacent the said second portion for signalling the quantity of indicia on the second portion which pass the second sensing means, and indicia counting computer means responsive to electric signals from the said two sensing means for determining the difference in quantities of indicia passing the said two sensing means for ascertaining the torsional displacement of one said indicia carrying portion with respect to the other said indicia carrying portion for determining the torque transmitted by the said resilient rotatable member from the driving to the driven machine.

7. A torque measurement apparatus comprising an elongated torsionally resilient rotatable member arranged to be connected between a driving and a driven machine, a first circular portion on the said resilient member located adjacent one end thereof, a plurality of closely spaced uniformly arranged serrations on the said first circular portion entirely around the periphery thereof, a second circular portion on the said resilient member located adjacent the other end thereof, a second set of closely spaced uniformly arranged serrations on the said second circular portion entirely around the periphery thereof, the total number of serrations on the said second circular portion being exactly the same as the total number on the said first circular portion, light source means for illuminating the said serrations, first photoelectric sensing means located adjacent the said first circular portion for sensing the total of the indicia on the first portion which pass the first sensing means, second photoelectric sensing means located adjacent the said second circular portion for sensing the total of the indicia on the second portion which pass the second sensing means, and electric computer means responsive jointly to the signals from the two said sensing means for determining the difference in quantities of indicia passing the said two sensing means whereby when torque is applied to the said resilient rotatable member the said difference is proportional to the torque applied.

References Cited in the file of this patent

UNITED STATES PATENTS

| | | |
|---|---|---|
| 2,586,540 | Holden | Feb. 19, 1952 |
| 2,621,514 | Waugh | Dec. 16, 1952 |

FOREIGN PATENTS

| | | |
|---|---|---|
| 180,805 | Germany | Feb. 2, 1907 |
| 600,980 | Great Britain | Apr. 23, 1948 |
| 1,123,711 | France | June 18, 1956 |